(12) United States Patent
Marchetto et al.

(10) Patent No.: US 7,291,998 B2
(45) Date of Patent: Nov. 6, 2007

(54) ELECTRICAL CONTROL SAFETY SYSTEM COMPRISING PHOTOCELLS OR EQUIVALENT SENSORS

(75) Inventors: Oscar Marchetto, Oderzo (IT); Sergio Tomasella, San Polo di Piave (IT); Luigi Sandrin, Gaiarine (IT); Fulvio Cuzziol, San Biagio di Callalta (IT)

(73) Assignee: Nice S.p.A., Oderzo (IT)

( * ) Notice: Subject to any disclaimer, the term of this patent is extended or adjusted under 35 U.S.C. 154(b) by 0 days.

(21) Appl. No.: 11/486,133

(22) Filed: Jul. 14, 2006

(65) Prior Publication Data

US 2007/0018600 A1 Jan. 25, 2007

Related U.S. Application Data

(63) Continuation-in-part of application No. 10/515,436, filed as application No. PCT/EP03/05900 on Jun. 2, 2003, now Pat. No. 7,091,687.

(30) Foreign Application Priority Data

Jun. 6, 2002 (IT) .......................... MI2002A1234

(51) Int. Cl.
    *H02H 7/00* (2006.01)
(52) U.S. Cl. ...................... 318/466; 318/286; 318/369
(58) Field of Classification Search ................ 318/466, 318/467, 468, 286, 369
    See application file for complete search history.

(56) References Cited

U.S. PATENT DOCUMENTS

| | | | |
|---|---|---|---|
| 4,148,019 A * | 4/1979 | Durkee ........................ 340/531 |
| 4,497,031 A | 1/1985 | Froehling et al. ............ 364/505 |
| 4,709,233 A | 11/1987 | Duval .................... 340/825.18 |
| 4,894,952 A * | 1/1990 | Trett et al. ...................... 49/25 |
| 5,089,974 A | 2/1992 | Demeyer et al. ............ 364/492 |
| 5,149,921 A * | 9/1992 | Picado ........................ 187/317 |
| 5,299,385 A | 4/1994 | McConnell ..................... 49/18 |
| 5,410,292 A | 4/1995 | Le Van Suu ........... 340/310.06 |
| 5,428,923 A | 7/1995 | Waggamon ..................... 49/28 |
| 5,583,334 A * | 12/1996 | Baumann ..................... 250/221 |
| 5,621,662 A | 4/1997 | Humphries et al. ......... 364/550 |
| 5,684,449 A | 11/1997 | Le Van Suu ........... 340/310.01 |
| 5,689,242 A | 11/1997 | Sims et al. .................. 340/652 |
| 5,710,712 A | 1/1998 | Labun ........................ 364/492 |
| 5,805,926 A | 9/1998 | Le Van Suu ................ 395/836 |
| 6,107,912 A | 8/2000 | Bullock et al. ........ 340/310.01 |
| 6,519,125 B2 | 2/2003 | Graube ........................ 361/62 |
| 6,525,915 B1 | 2/2003 | Graube ........................ 361/58 |

(Continued)

FOREIGN PATENT DOCUMENTS

EP 0624541 A2 11/1994

*Primary Examiner*—Rita Leykin
(74) *Attorney, Agent, or Firm*—Wenderoth, Lind & Ponack, L.L.P.

(57) ABSTRACT

An electrical control safety system is provided comprising two photocells or equivalent sensors applied on a sliding gate, the two photocell systems being composed respectively of at least two transmitters and two receivers, and the control safety system being cyclically able to make the first photocell system operate during a first operating time interval while the second photocell system is disabled, and being cyclically able to make the second photocell system operate, during a second operating time interval, subsequent to the first time interval, while the first photocell system is disabled.

16 Claims, 3 Drawing Sheets

U.S. PATENT DOCUMENTS 6,560,279 B1  5/2003  Renz ......................... 375/237
6,665,308 B1  12/2003  Rakib et al. ................ 370/441

2002/0101348 A1 *  8/2002  Imahori et al. ............. 340/540

* cited by examiner

ELECTRICAL CONTROL SAFETY SYSTEM COMPRISING PHOTOCELLS OR EQUIVALENT SENSORS

This application is a continuation-in-part of application Ser. No. 10/515,436, filed Nov. 23, 2004, now U.S. Pat. No. 7,091,687 which is the National Stage of International Application No. PCT/EP03/05900, filed Jun. 2, 2003, the disclosures of which are hereby incorporated herein by reference.

FIELD OF THE INVENTION

The present invention relates to an electrical control safety system comprising photocells or equivalent sensors.

BACKGROUND OF THE INVENTION

In electrical systems for controlling an entrance gate and/or a garage door of a dwelling, it is typical to locate the various units which make up the system where it is necessary, and connect them through electric wires.

In a dwelling, the following, for example, may be installed: a motor for one wing of the gate, a motor for the other wing of the gate, a motor for the garage door, a radio receiver for receiving the requests of movement of the gate and of the door coming from remote control transmitters, key-operated selectors and/or command keypads for operating the gate or the door, various safety photocell systems (each photocell system is composed of a receiver and a transmitter) or equivalent sensors, and luminous and/or acoustic devices for signalling the movement of the gate and the door.

Until a short time ago, the number of devices installed was fairly small (four or five) and these devices, for the sake of simplicity, were located very close to each other, for example next to the gate.

Recently, international safety regulations, on the one hand, and the requirements of users, on the other hand, have resulted in a considerable increase in the number of devices installed (often ten or so or even more) and in the impossibility of locating them close to each other; this tendency will continue in the future. Installed devices of this kind are electrically connected to the electrical control system; more precisely, generally these devices are connected directly and locally to the peripheral units of the electrical control system, which units are connected directly, by means of electric wires, to the central unit of the electrical control system, the "heart" of the system.

An important aspect of an electrical system for controlling a closing element which is moved electrically is safety. In particular, it is necessary to prevent the movement of the closing element from inadvertently causing damage to objects and, in particular, injury to persons.

A quite common way of obtaining this result is to identify an area inside which the movement of the closing element occurs and to stop this movement if an object or a person enters into this area. The safety devices most used for monitoring areas in these applications are photocell systems. As is well known, a photocell system is composed of a transmitter and a receiver. If the system is correctly installed, when the system is active, the transmitter emits light rays which are received by the receiver, and if an object or a person passes in between the transmitter and the receiver, the light rays do not reach the receiver and this situation is signalled by the system.

For proper monitoring of an area it is often necessary to use more than one photocell system and a suitable arrangement along the perimeter. FIG. 5 shows, in schematic form, a sliding gate CA located between two walls M1 and M2, two photocell systems FC1, FC2 composed respectively of two transmitters FC1-T, FC2-T and two receivers FC1-R, FC2-R.

Apparently the two photocell systems monitor adequately the area where the gate CA moves. If a person P, for example crosses the line which joins the transmitter FC2-T and the corresponding receiver FC2-R, the light beam of the photocell system FC2 is interrupted and the gate CA stops.

In reality, the two photocell systems FC1 and FC2 may interfere with each other. In fact, due to the closeness of the two systems FC1 and FC2, the light rays emitted by the transmitter of one of the two photocell systems reach the receiver of this photocell system, but also the receiver of the other photocell system (albeit with a reduced intensity). In this case, and as shown in FIG. 5, there is the risk that, even if the person P has entered into the monitored area, the gate CA is not stopped by the electrical control system because the two receivers FC1-R and FC2-R continue to receive light rays.

SUMMARY OF THE INVENTION

The main object of the present invention is that of providing a solution to the abovementioned safety issue.

This object is essentially achieved by the control system having the characteristic features described in the appended claims, whereas further advantageous aspects of the system are described in the dependent claims.

BRIEF DESCRIPTION OF THE DRAWINGS

The invention will become more apparent from the description which follows, considered together with the accompanying drawings, in which.

DETAILED DESCRIPTION OF THE INVENTION

Figure 5:
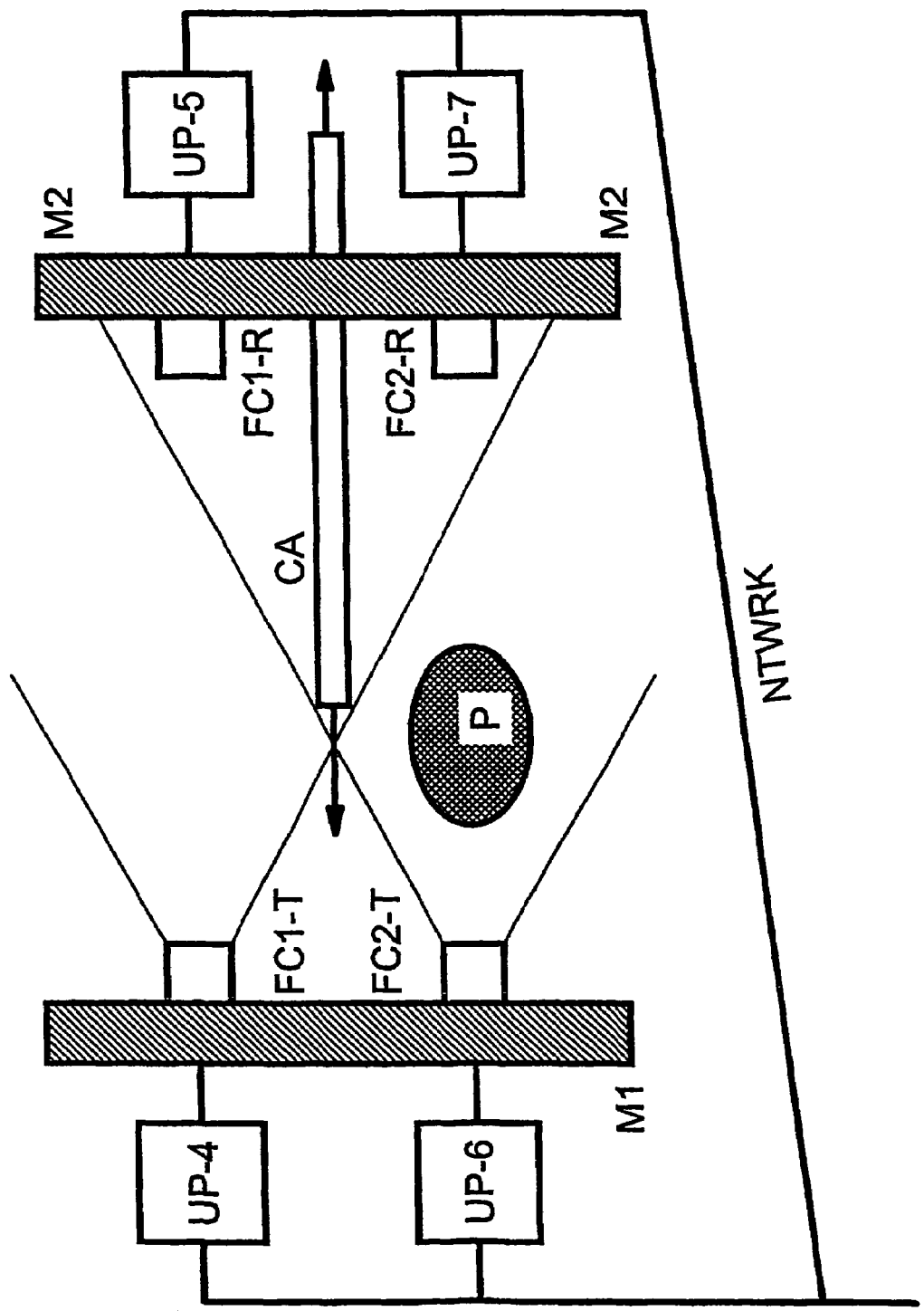
FIG. 5 shows an arrangement of two photocell systems and a diagram for connection to the respective peripheral units of the system.

As already mentioned, FIG. 5 shows, in schematic form, a sliding gate CA located between two walls M1 and M2, two photocell systems FC1, FC2 composed respectively of two transmitters FC1-T, FC2-T and two receivers FC1-R, FC2-R. A person P has entered into the monitored area.

In order to solve the problem of safety, the invention proposes to alternate and synchronize the operation of the two photocell systems. For example, if it is assumed that the first photocell system FC1 is made to operate for 10 ms, following which the photocell system FC2 is made to operate for 10 ms, and that this same procedure is continued afterwards, interference between the two systems is avoided. Obviously this solution may be used with different operating intervals and may be extended to a greater number of photocell systems. Also, synchronization between the photocell systems may be obtained by means of suitable circuitry connected to them.

With an electrical control system similar to that described hereinafter, it is possible to avoid advantageously the use of additional circuitry, as will be described below with reference to FIG. 5. Four peripheral units UP-4, UP-5, UP-6, UP-7 of an electrical control system (better described in the following) are provided. The peripheral units UP-4, UP-5, UP-6, UP-7 are connected with a network NTWRK respectively to the transmitter FC1-T, to the receiver FC1-R, to the transmitter FC2-T and to the receiver FC2-R. A central unit of the system (not shown in FIG. 5) is connected to the network NTWRK and prepared so that it transmits over the network NTWRK digital information packets at a fixed rate (for example every 30 ms). The four peripheral units UP-4, UP-5, UP-6, UP-7 are arranged so that they detect the packets and extract from this fixed-rate transmission a clock signal with a fixed period (30 ms in the example) which will be identical for all four units. The period of the clock signal may be divided into two equal parts; during the first part the system FC1 is activated by the units UP-4 and UP-5 and during the second part the system FC-2 is activated by the units UP-6 and UP-7.

A simple and advantageous manner for achieving this alternation in operation may be the following.

Four unit identification codes are assigned to the four peripheral units UP-4, UP-5, UP-6, UP-7; two odd codes (which are not necessarily different) are assigned to the units UP-4 and UP-5 and two even codes (which are not necessarily different) are assigned to the units UP-6 and UP-7. The units UP-4 and UP-5 will activate respectively the transmitter FC1-T and the receiver FC1-R of the system FC1 during the (odd) sub-period 1 of each period of the extracted clock signal, and the units UP-6 and UP-7 will activate respectively the transmitter FC2-T and the receiver FC2-R of the system FC2 during the (even) sub-period 2 of each period of the extracted clock signal.

Obviously these solutions may be extended to a greater number of photocell systems or equivalent sensors. Four systems should be sufficient to cover any requirement; in this case the alternation could be obtained by means of the last two bits of the unit identification code.

It must not be forgotten that the sub-period must have a duration which is sufficiently long to allow the reliable detection of an interruption in the light rays and that the period must have a duration which is sufficiently short to comply with the requirements stipulated by the international standards.

The electrical control system which controls the safety devices through the peripheral units may have the further function of controlling at least one gate or door or similar element (below reference will often be made to a gate for the sake of simplicity of the description) of the type moved by means of at least one corresponding electric motor. Said system comprises a) the electric network NTWRK consisting of two electric wires adapted to allow distribution of power supply and digital information;

b) the central control unit UC having two terminals T1,T2 adapted to be connected to the two wires of the network NTWRK in order to transmit direct-current power supply and to transmit and receive digital information; and c) a certain number of peripheral units UP (such as the units UP-4, UP-5, UP-6, UP-7 described above), each having two terminals T1,T2 adapted to be connected to the two wires of the network NTWRK in order to receive direct-current power supply and to receive and/or transmit digital information. The peripheral units are also adapted to control said safety devices.

Figure 1:
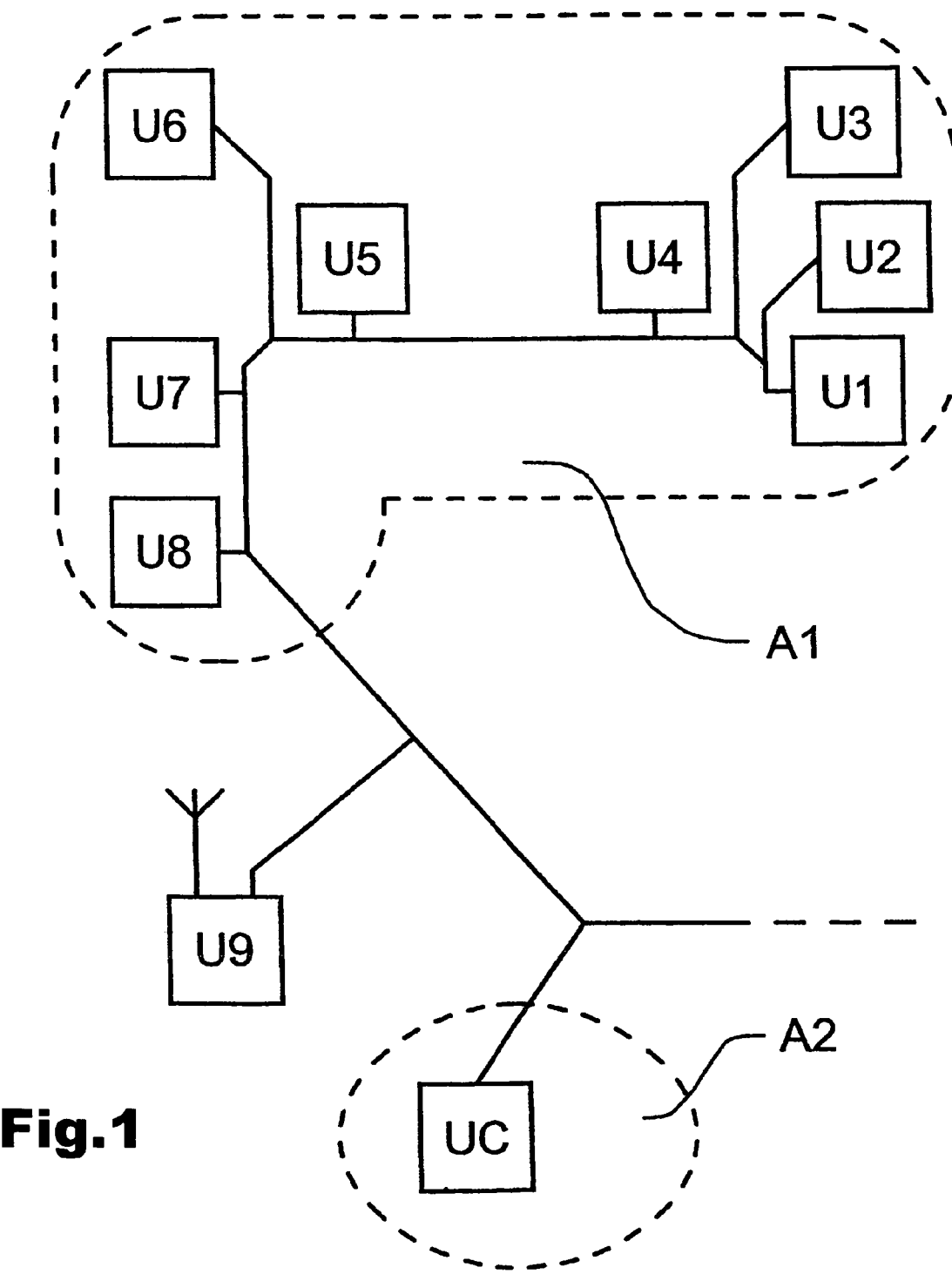
FIG. 1 shows a diagram of a fairly complicated system according to the present invention.
Figure 2:
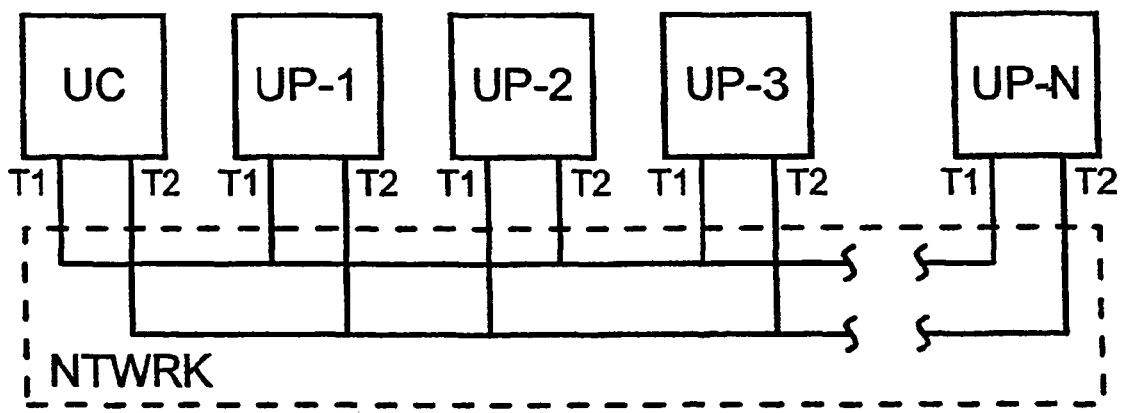
FIG. 2 shows a conceptual diagram of a system according to the present invention.
Figure 3:
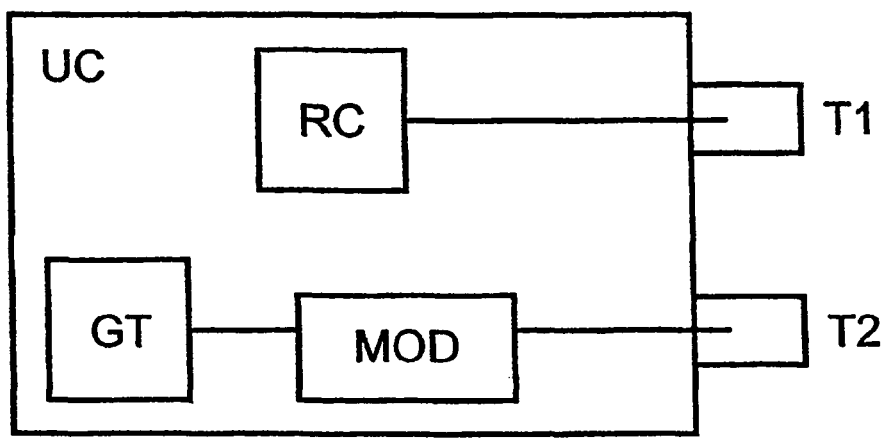
FIG. 3 shows a block diagram of a central unit according to the present invention.
Figure 4:
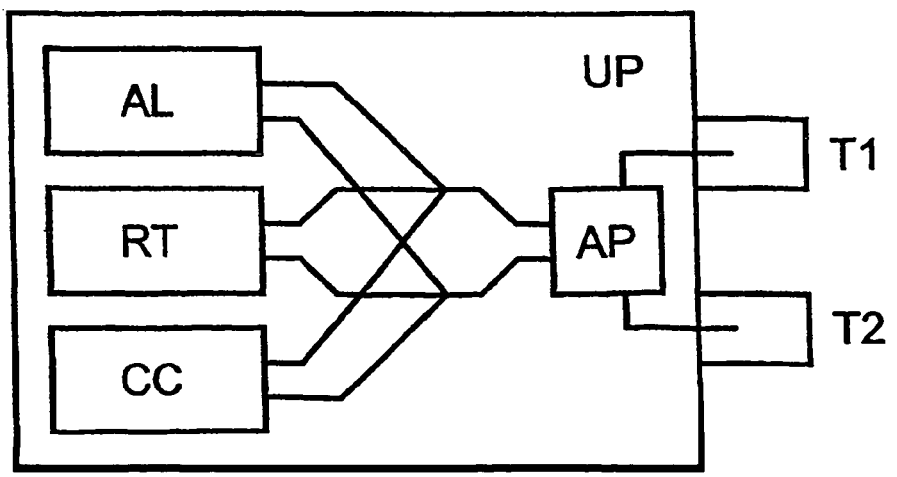
FIG. 4 shows a block diagram of a peripheral unit according to the present invention.

As can be seen from the diagram according to FIG. 1, the wiring is very simple, the number of wires is minimal (two both for the power supply and for the information) and the length of the wires is minimal if installation is performed properly (branches limited to the minimum necessary).

The units are all connected together (in parallel) on the network NTWRK and without the need to take into account the polarity. It is therefore not possible to make mistakes during connection since there are no constraints.

The power supply may be obtained in the form of direct current directly from the network NTWRK. This power supply is designed mainly for the peripheral units which make up the system and which may therefore be extremely simplified from the point of view of the power supply. These peripheral units may then in turn provide a power supply to the devices to which they are connected and which may therefore be simplified greatly from the point of view of the power supply.

The circuit which generates the power supply for the network NTWRK (and therefore for the peripheral units and if necessary for the devices connected to the latter) is generally located inside the housing which contains the central unit UC.

Depending on the type of device to which a peripheral unit is connected, the latter may have the need only to receive digital information (such as conceptually, for example, a luminous signalling device), only to transmit digital information (such as conceptually, for example, a safety device) and both to receive and transmit digital information (an intelligent safety device as will be clarified below).

Such an electrical control system may be connected to three essential devices: an electric motor for moving the gate, a device for entering requests of movement of the gate (for example a key-operated selector, a command keypad, a remote control receiver, etc.), and a safety device (for example a photocell system, a sensitive edges system, a mat presence detector, a radar presence detector, etc.).

In order to be adapted to exchange digital information correctly and efficiently, it is advantageous for each of the peripheral units to comprise memory means adapted to store an own unit identification code which may be used as an address. These memory means may consist of a conventional semiconductor memory (of the EPROM, EEPROM, FLASH or RAM type) or, more simply, of dip switches or also, even more simply, of jumpers. The choice depends both on cost criteria and on installation criteria: in fact the unit identification code may be determined either during production or during installation and may be fixed or variable.

By using switch-like components, i.e. jumpers, the user can therefore set the identification code or its function or position of the peripheral unit. In the case of photocells, this can be useful to establish the function of the photocells within the whole safety system, for instance a jumper is used to indicate the photocell is located in the upper/lower position, outside/inside a gate and so on.

For the safety devices consisting of a transmitting section and a receiving section (which are generally located well apart from each other), for example photocell systems, two associated peripheral units may be provided, being adapted to be connected respectively to the transmitting section and to the receiving section and being identified by the same unit identification code. In this way if the central unit needs to transmit digital information to the photocell system (for example a status reading request), a single transmission to the same address may be effected.

A particularly effective and efficient solution for establishing communication between a central unit and peripheral units consists in exchanging packets of digital information using the "master-slave" technique, wherein the central unit operates as the "master" and the peripheral units operate as "slaves"; in other words a peripheral unit waits to be interrogated by the central unit before transmitting a packet of digital information.

Depending on the type of device connected to the peripheral unit, when a peripheral unit receives a packet from the central unit, it might not be strictly necessary for the peripheral unit to transmit a response packet to the central unit. This typically occurs when the central unit transmits to the peripheral unit a command for activating a motor or a signalling device. For the central unit, however, it is advantageous that a response should be transmitted in any case. In fact, for example, this response packet could contain the information that the command has been carried out successfully, wherein failure to receive this confirmation could activate repetition of the transmission.

In the case of the "master-slave" technique, in order to ensure ordered communication between the central unit and peripheral units, the central unit may advantageously be adapted to transmit packets on the network at a fixed and predetermined rate, for example one every 10 or 20 or 30 ms.

In this case it is necessary to decide to whom the packets are to be addressed, many criteria may be used. On the one hand, it is necessary for the central unit to interrogate with a certain frequency the peripheral units connected to the input devices so as to be able to recognize any requests for opening or closing. On the other hand, it is necessary for the central unit to control suitably (by means of the peripheral units) the motor and the signalling devices. Also, the central unit must interrogate with a certain frequency, during the movement of the motor, the peripheral units connected to the safety devices in order to realize of dangerous situations. Other considerations which may influence the choice of destination will be clarified below.

One or more of the peripheral units may be adapted—as mentioned above—to extract timing information from the fixed-rate transmission of packets by the central unit. In fact, fixed-rate transmission, in addition to ensuring ordered communication within the system, distributes a unique timing information which is valid for the whole network and on the basis of which synchronization may be performed, if necessary.

It is reasonable that the length of the packets which are transferred within the network NTWRK should be the same in particular for the packets transmitted from the peripheral units. The structure of the packets transmitted from the central unit may, if necessary, differ from the structure of the packets transmitted from the peripheral units. In view of the type of application, the structure of the digital information packet may in any case be extremely simple: the packet from the central unit may consist, for example, essentially of a combination of the code of the peripheral unit and a sequence of one or two or three bits which identify a command, while the packet from the peripheral units may consist, for example, essentially only of short sequence of data bits.

In order to facilitate greatly the installation of the system, the central unit may be adapted to perform, during starting or re-starting of the system, identification of all the active peripheral units connected to the network by means of an exchange of packets; thus the central unit determines autonomously the composition of the system.

In order to obtain a diagnostics procedure for the system, the central unit may be adapted to perform, repeatedly during operation of the system, identification of all the active peripheral units connected to the network by means of an exchange of packets. By comparing the list of active peripheral units upon start-up of the system with the list of peripheral units which are active at a certain moment, it is possible to obtain, after any appropriate verification, identification of the faulty or isolated peripheral units. In connection with the faulty or isolated peripheral unit, the peripheral unit may decide to take suitable measures (light up a lamp, stop the system, or activate an alarm).

By suitably choosing the unit identification codes and the structure of the digital information packets (and obviously the software inserted in the central control unit), it is possible to program the central unit by means of a programming device connected to a particular peripheral unit identified by a reserved identification code.

An important aspect of an electrical system for controlling a closing element which is moved electrically is the reliability regarding the exchange of digital information. In some cases, problems with regard to exchange could result in undesirable occurrences (for example, failure of the gate to open), but in other cases could also result in serious accidents (for example, a person being trapped between the wings of a gate).

In the example above, an incorrect setting of the jumpers in the photocell system would mean to the control unit that two photocells are in the same position or the same function. Such a mistake in the installation, of course, may be detected and signalled. This occurs because the central unit during the polling of the peripheral units finds in their response data packet the information that two units claim the same function or the same position.

Errors in the exchange of information are primarily due to disturbances in the system network which overlap with the electrical data signals generated within the network itself; the errors may also be due to overlapping of two transmission operations performed by two different units of the system.

In a system such as that described above, a first measure which can be adopted in order to improve the reliability of data exchange, in particular in order to avoid errors due to overlapping, is that of using the "master-slave" technique (already mentioned above). In fact, the peripheral units transmit only upon a request from the central unit and the central unit interrogates only one peripheral unit at a time.

In a system such as that described above, a second measure which may be adopted in order to improve the reliability of data exchange, in particular in order to avoid errors due to disturbances, is that of providing a procedure whereby, following transmission of digital information, in particular a packet, from a source to a destination, the destination always provides a response to the source in the form of digital information, in particular a packet. For example, depending on the type of destination, the response may be a simple confirmation of receipt (acknowledgement) or an actual item of data.

In the case where the "master-slave" technique is used, the source is always the central unit of the system and the destination one of the peripheral units of the system.

In a system such as that described above, a third measure which may be adopted to improve the reliability of data exchange, in particular in order to avoid errors due to disturbances, is that of providing that the same digital information is transmitted twice from the same source to the same destination. Typically, the information could be sent in succession. In this case, the destination may consider the transmission valid only if the digital information received coincides. In the case of packet transmission, the source could transmit, for example, twice in succession the same packet to the same destination. It is obvious that this solution results in doubling of the amount of data traffic in the network.

It is also possible for the duplication of the transmission to be performed on the basis of predetermined criteria. For example, a choice which is a good compromise in terms of reliability and traffic is that of repeating the transmission only in relation to specific destination. For example, the undesired illumination of a luminous signalling device (i.e. without an actual command from the system) is an event which may be acceptable, while the undesired closing of a gate (i.e., without an actual command from the system) is an event which is not acceptable due to the risk of injury or damage. It is therefore possible, for example, to divide the peripheral units into "high risk" units and "low risk" units and duplicate only the information which is transmitted to the "high risk" units.

In the case where the "master-slave" technique is used, it may be advantageously provided that the only the central unit of the system, namely the "master" automatically transmits twice its digital information, in particular its packets, destined for the peripheral units, namely the "slaves". With regard to the peripheral units, if the central unit, on the basis of predetermined criteria, considers that it is necessary to duplicate transmission it will duplicate interrogation. This could be the case of safety devices, the transmitted data of which is extremely important for the central unit and for the system. In other words, if the first transmission of a data packet from the control unit to the peripheral unit may result in a positive response, i.e. in the case of a photocell the gate is moving and no obstacle is detected, or a negative one, the photocell detected an obstacle or it is malfunctioning. Before actuating the gate, the control unit polls the photocells to ensure they are active and expects a confirmation therefrom. With the gate moving, the control unit keeps on polling the peripheral units. Upon not receiving a positive response during the polling, the control unit may implement two strategies. The first is to alert the system and stop the gate upon the first negative response from one of the photocells. The second is to cyclically poll every peripheral unit. During the polling, one or more data packets may be sent to the same peripheral unit, to increase reliability. Instead of alarming the system when a peripheral unit does not respond after the first or immediately subsequent transmission, the unit can wait for all the units to be polled, and then to try a last check on the non-responding unit after which the system goes in emergency condition. This can give time to a false triggering to vanish.

Another measure to avoid errors and detect the correct configuration may be to implement a different data packet in the response transmission. In the data packet, data relating to the status of the unit can be inserted, i.e. the setting of the jumpers in a photocell (see example above) or a single cipher rolling code.

A measure which is quite widely used in order to determine errors in transmission of digital information is the parity bit. Well known in the telecommunications sector, moreover, is the existence of fairly complicated codes which allow the detection and/or correction of one or more transmission errors.

Even if the "master-slave" technique is used, it is not possible to eliminate entirely the risk that two peripheral units may transmit data to the central unit at the same time and therefore generate errors due to overlapping of two transmission operations. This could occur, for example, in the case where, due to disturbances, two different peripheral units might regard the same packet of digital information as being destined for them.

In a system such as that described above, a fourth measure which may be adopted to improve the reliability of data exchange, in particular in order to detect errors due to overlapping, is that of complicating the structure of the digital information packet. In this case, the packet comprises a data part and a check part. It is highly unlikely that, when receiving digital information resulting from the overlapping of two packets, the data part and the check part will correspond to each other.

If the "master-slave" technique is used, any overlapping generally occurs during response to interrogation by the "master". It may therefore be advantageously decided that the structure of the packet transmitted by the "master" should contain only the data (address+command) plus a parity bit and that the structure of the packet transmitted by a "slave" should contain both a data part and a check part without the parity bit. The check part could be provided in many different ways. A simple and effective solution will be described below.

The data part and the check part of the packet are chosen with the same length (for example 4 or 8 bits). The source which wishes to send digital information on the network takes a data digital sequence; takes a random digital sequence with the same length as the data (continuously generated in a known manner within the source); generates a digital check sequence by means of an EXCLUSIVE-OR operation between the data sequence and the random sequence; and inserts into the packet the data sequence and the check sequence and transmits the packet over the network. The destination receives the packet and performs the reverse operation (which is again an EXCLUSIVE-OR operation), extracting the digital data sequence transmitted in the absence of overlapping. If overlapping has occurred with a packet transmitted by another unit, the digital sequence extracted by the destination will not correspond to the digital data sequence transmitted, but the destination will be unable to detect this. If the source re-transmits the digital data sequence, the random digital sequence which is used will be different and therefore the second packet transmitted is different. The destination receives a second packet different from the first packet which has not been overlapped or been subject to different overlapping. If there has been no overlapping during both the transmission operations, the destination extracts the same digital sequence; and if, during at least one of the transmission operations, there has been overlapping, the destination obtains two different digital sequences and therefore detects the error.

What is claimed is:

1. An electrical control safety system comprising:
a first safety device and a second safety device, the first and second safety devices being used in connection with a gate or a door, the control safety system being cyclically able to make the first safety device operate during a first operating time interval while the second safety device is disabled, and to make the second safety device operate during a second operating time interval, subsequent to the first operating time interval, while the first safety device is disabled, wherein the first safety device comprises a first photocell system, and the second safety device comprises a second photocell system, the first photocell system being composed of a first transmitter and a first receiver, and the second photocell system being composed of a second transmitter and a second receiver, the control safety system being cyclically able to make the first photocell system operate during the first operating time interval while the second photocell system is disabled, and to make the second photocell system operate during the second operating time interval, subsequent to the first operating time interval, while the first photocell system is disabled, and wherein the electrical control safety system further comprises:

at least four peripheral units connected with a network, each of the at least four peripheral units being connected to a respective one of the first transmitter, the second transmitter, the first receiver, and the second receiver; and a central unit for transmitting digital information packets to the at least four peripheral units over the network.

2. The electrical control safety system according to claim 1, wherein the at least four peripheral units are arranged so as to detect the digital information packets and to extract from the digital information packets a clock signal, the clock signal having an identical period for each of the at least four peripheral units.

3. The electrical control safety system according to claim 2, wherein the period of the clock signal is divided into two equal parts, the two equal parts including a first part and a second part, wherein during the first part, only a first peripheral unit and a second peripheral unit of the at least four peripheral units are activated, and wherein during the second part, only the peripheral units other than the first peripheral unit and the second peripheral unit of the at least four peripheral units are activated.

4. The electrical control safety system according to claim 2, wherein unit identification codes are assigned to the at least four peripheral units, the unit identification codes including at least two odd codes and two even codes, wherein a first peripheral unit and a second peripheral unit of the at least four peripheral units are able to activate the first transmitter and the first receiver of the first photocell system during an odd sub-period of each period of the extracted clock signal, and a third peripheral unit and a fourth peripheral unit of the at least four peripheral units are able to activate the second transmitter and the second receiver of the second photocell system during an even sub-period of each period of the extracted clock signal.

5. The electrical control safety system according to claim 1, wherein the central control unit is adapted to be electrically connected to an electric motor for controlling an operation thereof.

6. The electrical control safety system according to claim 1, wherein the central unit is adapted to be electrically connected to a device for entering requests of movement of the gate or the door.

7. The electrical control safety system according to claim 1, wherein the central unit is operable to establish communication with the at least four peripheral units through an exchange of packets of digital information according to a "master-slave" technique, and wherein the central unit operates as "master" and the peripheral units operate as "slaves".

8. The electrical control safety system according to claim 1, wherein the central unit is operable to cyclically poll every one of the peripheral units with a transmission of one or more data packets, to which each of the peripheral units responds to by transmitting a response data packet.

9. The electrical control safety system according to claim 8, wherein each of the peripheral units is operable to send over the network the response data packet, the response data packet sent by each of the peripheral units comprising the status of the respective peripheral unit itself.

10. The electrical control safety system according to claim 8, wherein the central unit, in the event one of the peripheral units has not been responding, is operable to wait for all of the peripheral units to be polled, and then to perform a last check on the non-responding one of the peripheral units.

11. The electrical control safety system according to claim 8, wherein each of the response data packets transmitted over the network comprises a data part and a check part.

12. The electrical control safety system according to claim 1, wherein the central unit is operable to transmit the digital information packets over the network at a fixed rate.

13. The electrical control safety system according to claim 1, wherein each of the digital information packets transmitted over the network comprises a data part and a check part.

14. The electrical control safety system according to claim 1, wherein the network comprises two wires.

15. The electrical control safety system according to claim 3, wherein unit identification codes are assigned to the at least four peripheral units, the unit identification codes including at least two odd codes and two even codes, wherein a first peripheral unit and a second peripheral unit of the at least four peripheral units are able to activate the first transmitter and the first receiver of the first photocell system during an odd sub-period of each period of the extracted clock signal, and a third peripheral unit and a fourth peripheral unit of the at least four peripheral units are able to activate the second transmitter and the second receiver of the second photocell system during an even sub-period of each period of the extracted clock signal.

16. The electrical control safety system according to claim 9, wherein the central unit, in the event one of the peripheral units has not been responding, is adapted to wait for all of the peripheral units to be polled, and then to perform a last check on the non-responding one of the peripheral units.

* * * * *